United States Patent [19]

Cermak et al.

[11] 4,080,160
[45] Mar. 21, 1978

[54] FIXING PIGMENT TO TEXTILE WITH MONO-SULPHATED OLEIC ACID AMIDE

[75] Inventors: Georg Cermak, Frankfurt am Main-Fechenheim; Gerhard Pfeiffer, Bad Soden, both of Germany

[73] Assignee: Cassella Farbwerke Mainkur Aktiengesellschaft, Germany

[21] Appl. No.: 694,587

[22] Filed: Jun. 10, 1976

[30] Foreign Application Priority Data

Jun. 13, 1975 Germany .............................. 2526516
Feb. 27, 1976 Germany .............................. 2608024

[51] Int. Cl.² ........................ D06P 5/00; D06M 13/34
[52] U.S. Cl. ...................................... 8/18 R; 8/18 A; 8/37; 8/52; 8/54.2; 8/86; 8/89 R; 8/182; 8/194; 260/37 N
[58] Field of Search ....................... 8/115.6, 18 R, 194, 8/18 A, 86, 89 R, 182

[56] References Cited

U.S. PATENT DOCUMENTS 2,127,770 8/1938 Franz et al. .................................. 8/62
2,310,074 2/1943 Gotte .......................................... 8/54

FOREIGN PATENT DOCUMENTS 595,173 4/1934 Germany.
341,053 1/1931 United Kingdom.

OTHER PUBLICATIONS

E. N. Abrahart, "Dyes and Dyeing" in Encyclopedia Brittanica, p. 1099.
C. H. Giles, "Dyestuffs and Pigments" in Encyclopedia Brittanica, p. 1105.
Hackh's Chemical Dictionary, Fourth Edition, (McGraw-Hill, 1972), p. 522.

*Primary Examiner*—A. Lionel Clingman
*Attorney, Agent, or Firm*—Connolly and Hutz

[57] ABSTRACT

The formation of undesired difficulty removable film on dyeing equipment when dyeing with aqueous pigment dispersions containing cross-linking resin, is reduced by incorporating in the dispersions a mono-sulphated oleic acid amide.

11 Claims, No Drawings

FIXING PIGMENT TO TEXTILE WITH MONO-SULPHATED OLEIC ACID AMIDE

The present invention relates to the commercial operation of fixing pigments such as dyes to textile fibers or fabrics. In such operations there is applied to the textile an aqueous dispersion of the pigment and of a cross-linking resin or of a cross-linking resin mixture that cures to fix the pigment on the textile. Such operation as well as dispersion formuations used in them are well known and described for instance in Ullmann's Enzyklopaedie der technischen Chemie, Third Edition, Volume 17 (1966), page 139, H. Warson "The Applications of Synthetic Resin Emulsions", London 1972, pages 603 and 713–19, German Offenlegungsschrift No. 1,519,529, Offenlegungsschrift No. 1,619,661 and Auslegeschrift No. 1,719,395, and U.S. published patent application No. B 408,487. the resin or resin mixtures used are made from monomers and or oligomers to give polymers that cross-link at elevated temperatures to which they are subjected after application to the textile, to cure and fix the pigment to the textile fibers. Curing accelerators, such as acids or acid-generating materials are present in such resin mixtures to speed the curing.

Among the objects of the present invention is the provision of an improved technique for effecting the foregoing pigment fixing.

An additional object of the present invention is the provision of improved dispersions for the foregoing fixing operation.

These as well as additional objects of the present invention will be more fully understood from the following description of several of its exemplifications.

Prior art dispersions of pigment dyes having cross-linking resins cure very rapidly and also have a more or less pronounced tendency to deposit films on dyeing and printing equipment these dispersions contact. Such films form for example on padding rollers, printing stencils, printing rollers, etc., and grow in thickness. In a relatively short time these filsm become insoluble in water and their removal then requires a mechanical scrubbing treatment. On padding rollers such films can form after about 10 to 20 minutes of operation, and then interfere with the padding as well as the resultant dyeing.

According to the present invention such film formation is delayed or completely suppressed and the use of dyeing equipment to apply aqueous pigment-fixing dispersion of cross-linking resin or cross-linking resin mixtures is improved when these dispersions also contain, in an amount from about 0.5% to about 30% of the resin solids by weight, a salt of monosulfated oleic acid amide having the formula $RNR^1R^2$ where
R is the monosulfated oleyl structure in the form of a salt,
$R^1$ is hydrogen or lower alkyl, and
$R^2$ is hydrogen, lower alkyl or phenyl.

While any cross-linking resin or resin mixture including silicone resins can be used in the foregoing dispersions, it is preferred to use with conventional textiles carbon type resin or resin mixtures which can be produced by (e.g.) suspension polymerisation or emulsion polymerisation. In general, the resins are based on acrylic compounds and methacrylic compounds since these can be polymerised with one another as well as together with other polymerisable monomers. Examples of suitable acrylic compounds and methacrylic compounds are acrylic acid and methacrylic acid as well as their salts, their esters in which the alcohol component can contain, for example, 1 to 6 carbon atoms, acrylonitrile, methacrylonitrile, acrylamide and methacrylamide. In principle, all the organic compounds which contain at least one polymerisable double bond in the molecule, for example vinyl compounds, such as vinylesters, vinylethers, vinylidenechloride, monocarboxylic and dicarboxylic acids which have an $\alpha,\beta$-double bond and their derivatives, especially their esters, nitriles and amides, and also olefines, styrene and its derivatives, conjugated diolefines, such as for example butadiene and the like, and esters of unsaturated alcohols, are suitable for copolymerisation with the above and other acrylic compounds and methacrylic compounds. Cross-linking components, such as, for example N-methylolacrylamide, N-methylolmethacrylamides or their $C_1$ to $C_4$ alkyl ethers or alkyl esters, or N-acryloyl-N'-formyl-methylenediamine, can also be copolymerised.

It is preferred to use conventional carbon type resin or resin mixtures in which at least about 55% of the resin solids by weight are acrylic. Melamin-formaldehyde and other aminoplast resins can also be used with particular advantage in combination with such acrylic resin mixtures, that is, compounds having

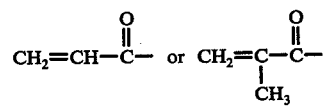

structural elements in their molecules.

The above-described cross-linking resins are cured to water-insoluble cross-linked condition preferably with an acid type catalyst that can be present in an amount of about 0.1 to about 10% of the resin solids by weight. Examples of such cross-linking catalysts are acids, salts having an acid reaction, such as, for example, ammonium chloride, ammonium sulphate and diammonium phosphate, or substances which generate acids under the fixing conditions, such as, for example, dimethyl oxalate and methyl p-toluenesulphonate.

The use of the dispersions of the present invention considerably delay the formation of an undesired coating on dyeing and printing equipment. A thin film which forms in some cases when using these dispersions can be rinsed off with water. Surprisingly, the fastness properties of the cured binder are not adversely influenced by the addition of a salt, especially the sodium salt of the mono-sulphated oleic acid amides. On the contrary a more uniform surface appearance and a reduction in the tendency towards migration on drying are observed.

The water-soluble salts are preferred. The water-soluble salts, and especially the sodium salt, of mono-sulphated oleic acid dibutylamide display very good film-reducing action. The two butyl groups can be primary, secondary, tertiary or isobutyl groups. The water-soluble salts, and especially the sodium salt, of mono-sulphated oleic acid N-methyl-anilide are also very effective. The ammonium and potassium salts may also be used. The lower alkyls substituted on the amide each have up to six carbons.

strength aqueous dispersion of copper phthalocyanine, 100 g of a 38.7% strength copolymer dispersion consisting of 89.4% of acrylic acid butyl ester, 5.3% of acrylonitrile and 5.3% of N-acryloyl-N'-formyl-methylenediamine, and 20 g of 2-amino-2-methyl-propanol-hydrochloride.

A troublesome coating formed on the padding rollers after a running time of 30 minutes and could no longer be removed by rinsing with water alone; the padding rollers could be cleaned only by vigorous rubbing with a sponge with the aid of an abrasive.

For comparison, the cotton fabric was padded under the same conditions using the same padding liquor to which had been added 10%, based on the solids content of the copolymer dispersion, of the sodium salt of mono-sulphated oleic acid di-n-butyl-amide. Only a very thin moist film was observed on the padding rollers after a running time of 1 hour and this film did not interfere with the operation and could be removed easily by spraying with water. After drying, the dyeing was fixed by dry heating to 170° C for 2 minutes. A deep blue dyeing with very good fastness properties was obtained. Comparable results were also obtained when 20% of the sodium salt of sulphated oleic acid N-methyl-anilide were used in place of 10% of the sodium salt of mono-sulphated oleic acid di-n-butyl-amide.

Similar results were also obtained when the sodium salt of mono-sulphated oleic acid N-methylanilide was replaced by the sodium salt of mono-sulphated oleic acid di-ethylamide.

The copolymer dispersion of this Example was manufactured in the following way:

400 ml of deionised water were initially introduced into a flask fitted with a stirrer, a gas inlet tube and a bottom valve. While passing a slow stream of nitrogen through the water, 25 g of a technical grade mixture of sodium pentadecanesulfonates (obtainable under the trade mark Mersolat H from Messrs. Bayer AG, Leverkusen, Germany) were dissolved therein and 336 g of acrylic acid butyl ester, 20 g of acrylonitrile and 20 g of N-acryloyl-N'-formyl-methylene-diamine were then emulsified in the mixture over a period of about 30 minutes. About 150 ml of the monomeric emulsion were then run off, through the bottom valve, into a flask which was fitted with a stirrer, a thermometer, 2 dropping funnels, a gas inlet tube, an inlet for the monomer emulsion and a water bath. The temperature of the monomer emulsion in the reaction flask, through which a slow stream of nitrogen was passed, was brought to 40° C (water bath) and dropwise addition of 4.0 g of ammonium peroxy-disulphate, dissolved in 50 ml of water, and of 1.0 g of sodium pyrosulphite, dissoled in 50 ml of water, was then started from separate dropping funnels. Polymerization started after a short time and the temperature of the reaction mixture rose to 46°–48° C. The remaining monomer emulsion and catalyst solutions were allowed to run in in the course of 2 hours at such a rate that the temperature did not exceed 48° C. When the polymerization had ended, the mixture was stirred for a further 1 hour at 50° C. The polymer dispersion thus obtained had a solids content (resin content) of 38.7% by weight and a pH value of 2.4.

Substituting for this dispersion, those of the examples which follow also gave the foregoing advantages.

EXAMPLE 2

A cotton fabric was padded (70% liquor pick-up) on a padder with a liquor containing per liter of the liquor: 50 g of a 42% strength aqueous dispersion of 5,5'-dichloro-7,7'-dimethyl-thioindigo, 200 g of a 40% strength aqueous dispersion of a copolymer consisting of 84% of ethyl acrylate, 11% of N-methylol-acrylamide and 5% of acrylonitrile, which dispersion contained 10%, based on the solids content of the copolymer, of the Na salt of mono-sulphated oleic acid di-n-butylamide, and 20 g of a 33% strength aqueous solution of diammonium phosphate.

After padding and drying, the textile material was subjected to a temperature of 150° C for 5 minutes. A red-violet dyeing, which was distinguished by a soft handle and very good fastness properties, was obtained without troublesome film formation.

Similar results are also obtained when the sodium salt of mono-sulphated oleic acid di-n-butylamide was replaced by twice as much of the sodium salt of mono-sulphated oleic acid N-methyl-anilide or by the sodium salt of mono-sulphated oleic acid diethylamide.

EXAMPLE 3

A heavy fabric of polyvinyl alcohol was padded (liquor pick-up 60%) on a padder with a liquor which contained per liter 50 g of a 46% strength aqueous dispersion of chlorinated copper phthalocyanine, 200 g of a 40% strength aqueous dispersion of a copolymer consisting of 84% of ethyl acrylate, 11% of N-methylol-acrylamide and 5% of acrylonitrile, which dispersion contained 15%, based on the solids content of the copolymer of the Na salt of mono-sulphated oleic acid N-ethyl-anilide, 100 g of a 65% strength aqueous solution of penta-methyl ether of hexamethylolmelamine and 20 g of a 33% strength aqueous solution of diammonium phosphate.

After padding and drying, the textile material was subjected to a temperature of 170° C for 2 minutes. A green dyeing, which was distinguished by a soft handle and very good fastness properties, was obtained, and the equipment did not have to be cleaned after a two-hour run.

Similar results were also obtained when the sodium salt of mono-sulphated oleic acid N-ethyl-anilide was replaced by the sodium salt of the following mono-sulphated materials: oleic acid amide, oleic acid dimethylamide, oleic acid di-n-hexylamide, oleic acid methylethylamide, oleic acid monomethylamide, oleic acid monoethylamide, oleic acid anilide, oleic acid monohexylamide or oleic acid di-n-butylamide.

EXAMPLE 4

A cotton fabric was padded (liquor pick-up 70%) on a padder with a liquor which contained per liter 30 g of Hydrosol Light Blue B (Color Index No. 53,441) that had been dissolved in 400 g of hot water. After cooling that solution to 30° C, 30 g of a 67% strength aqueous solution of a methyl ether of hexamethylol-melamine averaging 5.2 groups per mol, 60 g of the resin dispersion of Example 2, and 20 g of a 33% strength aqueous solution of ammonium chloride were added, and the mixture diluted to 1 liter.

After padding and drying, the textile material was subjected to a temperature of 170° C for 2 minutes. A dyeing with good to very good fastness properties was obtained.

EXAMPLE 5

A polyester fabric was padded (liquor pick-up 60%) on a padder with a liquor which contained per liter 30 g of Samaron Orange HB (Color Index No. 26,080), 50 g of the resin dispersion of Example 2, and 10 g of a 35% strength solution of 2-amino-2-methylpropanol-hydrochloride.

After padding and drying, the textile material was subjected to a temperature of 210° C for 1 minute. An orange-brown dyeing, which was distinguished by a soft handle and very good fastness properties, was obtained.

EXAMPLE 6

A cotton fabric was printed by the screen printing process, using a printing paste of the following composition: 20 parts by weight of a 38% strength aqueous dispersion of the coupling product of 2 mols of acetoacetic acid, 2,5-dimethoxy-4-chloroanilide and 1 mol of tetrazotized 2,2'-dichlorobenzidine, 100 parts by weight of the resin dispersion of Example 2, 860 parts by weight of an oil-in-water emulsion of the composition mentioned below and 20 parts by weight of a 33% strength solution of diammonium phosphate, adding up to a total of 1,000 parts by weight.

The oil-in-water emulsion was obtained by emulsifying 880 parts by weight of heavy naphtha with a boiling range of 180° to 230° C into a solution consisting of 8 parts by weight of the reaction product of 13 mols of ethylene oxide and 1 mol of triisobutylphenol, 50 parts by weight of a 3% strength aqueous solution of carboxymethylcellulose or ammonium alginate, and 62 parts by weight of water.

The print was then dried and fixed by dry heating to a temperature of 150° C for 5 minutes. A brilliant yellow print with very good fastness properties was obtained.

In Examples 4, 5 and 6 the sodium salt of mono-sulphated oleic acid di-n-butylamide can be replaced by other amides of the present invention, especially by the sodium salt of monosulphated oleic acid N-ethyl-anilide, without materially changing the results.

The resin dispersions used in Examples 4, 5 and 6 contained both the resin and mono-sulphated oleic acid amide of Example 2, and did not form any significant amount of film on the padding, rolling or printing equipment used.

Other resins that are not cross-linking can also be present in the dispersions of the present invention. Thus there can be added to the dispersion of Example 1 a dispersion of polybutadiene or polyvinyl chloride in an amount that adds a resin solids weight 80% that of the cross-linking arcylic resin, although better results are obtained when the non-cross-linking resin solids are not over about 25% by weight of the total resin solids.

Uncured phenol-formaldehyde condensations can also be used as cross-linking resin in accordance with the present invention. However, the cross-linking acrylic resins provide particularly good resuts and it is preferred that these resins constitute at least ¼ of the total resin content by weight.

Obviously many modifications and variations of the present invention are possible in the light of the above teachings. It is, therefore, to be understood that within the scope of the appended claims the invention may be practiced otherwise than as specifically described.

What is claimed:

1. In the process of using textile dyeing equipment to color a substrate with an aqueous dispersion of a dye or pigment and of a cross-linking resin that cures to fix the dye or pigment to the article being colored, the improvement according to which the dispersion also contains in an amount from about 0.5% to about 30% of the resin solids by weight, a salt of monosulphated oleic acid amide having the formula $RNR^1R^2$ 

where
  R is the monosulfated oleyl structure in the form of a salt,
  $R^1$ is hydrogen or lower alkyl and
  $R^2$ is hydrogen, lower alkyl or phenyl.

2. The improvement of claim 1 in which the dyeing equipment is cleaned by a stream of water when a film builds up on it from the dispersion.

3. The improvement of claim 1 in which the amide concentration in the dispersion is between about 10% and about 20% of the resin solids by weight.

4. The improvement of claim 1 in which $R^1$ and $R^2$ are both n-butyl.

5. The improvement of claim 1 in which $R^1$ is methyl and $R^2$ is phenyl.

6. In an aqueous colorant dispersion containing textile dye or pigment and a cross-linking resin that cures to fix the dye or pigment to a textile substrate, the improvement according to which the dispersion also contains in an amount from about 0.5% to about 30% of the resin solids by weight, a salt of monosulphated oleic acid amide having the formula $RNR^1R^2$ 

where
  R is the monosulfated oleyl structure in the form of a salt,
  $R^1$ is hydrogen or lower alkyl, and
  $R^2$ is hydrogen, lower alkyl or phenyl.

7. The combination of claim 6 in which the amide concentration in the dispersion is between about 10% and about 20% of the resin solids by weight.

8. The combination of claim 6 in which $R^1$ and $R^2$ are both n-butyl.

9. The combination of claim 6 in which $R^1$ is methyl and $R^2$ is phenyl.

10. The improvement of claim 1 in which at least about 55% of the resin solids are acrylic.

11. The combination of claim 6 in which at least about 55% of the resin solids are acrylic.

* * * * *